United States Patent
Raveendran et al.

(10) Patent No.: US 12,181,379 B2
(45) Date of Patent: Dec. 31, 2024

(54) ANOMALY DETECTION AND FAILURE PREDICTION FOR PREDICTIVE MONITORING OF INDUSTRIAL EQUIPMENT AND INDUSTRIAL MEASUREMENT EQUIPMENT

(71) Applicant: SPARTAN CONTROLS LTD., Calgary (CA)

(72) Inventors: Rahul Raveendran, Calgary (CA); Hailei Jiang, Calgary (CA)

(73) Assignee: SPARTAN CONTROLS LTD., Calgary (CA)

( * ) Notice: Subject to any disclaimer, the term of this patent is extended or adjusted under 35 U.S.C. 154(b) by 137 days.

(21) Appl. No.: 17/853,491

(22) Filed: Jun. 29, 2022

(65) Prior Publication Data

US 2022/0412845 A1    Dec. 29, 2022

Related U.S. Application Data

(60) Provisional application No. 63/216,204, filed on Jun. 29, 2021.

(51) Int. Cl.
*G06F 11/30* (2006.01)
*G01M 99/00* (2011.01)

(52) U.S. Cl.
CPC .................. *G01M 99/005* (2013.01)

(58) Field of Classification Search
CPC .................................................. G01M 99/005
See application file for complete search history.

(56) References Cited

U.S. PATENT DOCUMENTS

2019/0196460 A1* 6/2019 Rosca ............... G05B 23/0254
2020/0012270 A1* 1/2020 Hollender ......... G05B 23/0229

* cited by examiner

*Primary Examiner* — Phuong Huynh
(74) *Attorney, Agent, or Firm* — Sheppard, Mullin, Richter & Hampton LLP (57) ABSTRACT

A system and method for predicting the failure and estimating the health of the industrial equipment or industrial measurement equipment and diagnosing the root cause of the incipient failures is provided. The system and method are applicable to different types of flow meters used in flow measurement applications and other industrial equipment or industrial measurement equipment. A means to detect anomalies in the industrial equipment or industrial measurement equipment diagnostic signals is provided and thereby allowing incipient failure prediction. The system and method provides the means to calculate the current state of health of the industrial equipment or industrial measurement equipment. Leading indicator/failed component in the industrial equipment or industrial measurement equipment can be tracked down in the event of a failure. The system and method provides the means to label the normal and abnormal periods in the historical data based on the available diagnostic alarms and signals.

20 Claims, 11 Drawing Sheets

ANOMALY DETECTION AND FAILURE PREDICTION FOR PREDICTIVE MONITORING OF INDUSTRIAL EQUIPMENT AND INDUSTRIAL MEASUREMENT EQUIPMENT

CROSS-REFERENCE TO RELATED APPLICATIONS

The present application claims priority from U.S. Provisional Application No. 63/216,204 filed Jun. 29, 2021 the entirety of which is hereby incorporated by reference for all purposes.

TECHNICAL FIELD

The present disclosure relates to industrial equipment and industrial measurement equipment, and in particular to anomaly detection and failure prediction for predictive monitoring of industrial equipment and industrial measurement equipment.

BACKGROUND

Industrial equipment, including, for example, compressors, pumps and valves, are used in critical applications in various industries. Currently, users must manually trend process and diagnostic signals to determine whether the industrial equipment is operating in a healthy or unhealthy state.

Similarly, industrial measurement equipment, including, for example, flow meters and pressure sensors, are used in critical measurement applications, with users required to manually look at diagnostic signals from the industrial measurement equipment to determine whether the industrial measurement equipment is operating in a healthy or unhealthy state.

Timely prediction and/or detection of industrial equipment and industrial measurement equipment failure is necessary to avert a loss or a potential service-impacting event. However, decisions regarding whether industrial equipment and industrial measurement equipment is operating in a healthy or unhealthy state is largely based on personal experience, and those users may only discover the status of their industrial equipment or industrial measurement equipment after a failure has occurred. Identification and characterization of failing or failed industrial equipment and industrial measurement equipment requires manual data collection from a variety of sources, such as, for example, from vibration transmitters or drive diagnostics, and processing of the data to potentially identify potential reasons for the failing or failed industrial equipment or industrial measurement equipment.

Accordingly, systems and methods that enable anomaly detection and failure prediction for predictive monitoring of industrial equipment and industrial measurement equipment remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

According to one aspect of the disclosure, there is provided a method of anomaly detection and failure prediction for predictive monitoring of industrial equipment or industrial measurement equipment of an associated process. The method includes: receiving a plurality of historical diagnostic measurements associated with a respective industrial equipment or industrial measurement equipment of the associated process; generating an anomaly detection model of associated performance for each measurement signal group associated with the industrial equipment or industrial measurement equipment defining statistical limits for operation of each measurement signal group from the plurality of historical diagnostic measurements; receiving real-time or near-real-time diagnostic measurements associated the respective industrial equipment or industrial measurement equipment; scoring a performance metric for each measurement signal group associated with the industrial equipment or industrial measurement equipment based on the received diagnostic measurements and the generated anomaly detection model; and identifying the performance metric score for each measurement signal group to predictively identify potential failure of the industrial equipment or industrial measurement equipment. Other embodiments of this aspect include corresponding computer systems, apparatus, and computer programs recorded on one or more computer storage devices, each configured to perform the actions of the methods.

Implementations may include one or more of the following features. The method further including: generating a predicted failure time for the industrial equipment or industrial measurement equipment from the received diagnostic measurements and the generated anomaly detection model. The method may further include: receiving historical process status information; associating the historical process status information with an operating mode of the process; and associating the operating mode of the process in the anomaly detection model. Plurality of historical diagnostic measurements may be grouped into signal grouping based on an associated weighting factor, wherein each group is associated with a respective anomaly scoring model. The respective anomaly scoring model may be weighted with an importance metric identifying contribution to identifying performance of the measurement signal group. Statistical thresholds may be generated from the statistical model for each industrial equipment or industrial measurement equipment and associated measurement signal group. Health score may be generated based upon a combination of performance metrics of each measurement signal group. Root cause analysis tree may be generated based on the statistical thresholds on the anomaly scores and the component level diagnostic signals, root cause analysis logic determines anomaly events in the signal groups and component level diagnostic signals. The method may further include generating a time to failure model. The plurality of historical diagnostic measurements and real-time or near-real-time diagnostic measurements associated the respective industrial equipment or industrial measurement equipment may be remotely located and received through a network. The network may be a wireless network. The network may be a wired network. The method may further include correlating the plurality of historical diagnostic measurements if performed for multiple industrial equipment or industrial measurement equipment. The method may further include correlating the plurality of historical diagnostic measurements if performed for multiple industrial equipment or industrial measurement equipment associated with a respective model, type or brand identification. The method further including labelling normal and abnormal periods in the historical data based on diagnostic alarms and signals available from the industrial equipment or industrial measurement equipment. Implementations of the described techniques may include hardware, a method or process, or computer software on a computer-accessible medium.

One general aspect includes a method of anomaly detection and failure prediction for predictive monitoring of ultrasonic flow meters of an associated process. The method includes: receiving real-time or near-real-time diagnostic measurements associated with a respective industrial equipment or industrial measurement equipment of the associated process; scoring a performance metric for each measurement signal group associated with the industrial equipment or industrial measurement equipment based on the received diagnostic measurements and an anomaly detection model associated with the industrial equipment or industrial measurement equipment; identifying the performance metric score for each measurement signal group of the industrial equipment or industrial measurement equipment; and displaying the performance metric score and the identified parameter primarily contributing to the performance metric score for a measurement signal group of the industrial equipment or industrial measurement equipment. Other embodiments of this aspect include corresponding computer systems, apparatus, and computer programs recorded on one or more computer storage devices, each configured to perform the actions of the methods.

Implementations may include one or more of the following features. The method further including displaying a root cause analysis for a selected measurement signal group of the industrial equipment or industrial measurement equipment.

One general aspect includes a system which includes: a processor; a network interface coupled to the processor for receiving diagnostic measurements from a plurality of industrial equipment or industrial measurement equipment associated with a process; and a memory containing instruction which when executed by the processor perform the method described herein. Other embodiments of this aspect include corresponding computer systems, apparatus, and computer programs recorded on one or more computer storage devices, each configured to perform the actions of the methods.

Embodiments are described below, by way of example only, with reference to FIGS. 1-11.

A system and method for predicting the failure and estimating the health of the industrial equipment or industrial measurement equipment and diagnosing the root cause of the incipient failures is provided. The system and method are applicable to a range of industrial equipment or industrial measurement equipment, including, for example, to multipath flow meters, including ultrasonic flow meters (UFMs), used in flow measurement applications and to rotating equipment used in industrial applications. A means to detect anomalies in the industrial equipment or industrial measurement equipment diagnostic signals is provided and thereby allowing incipient failure prediction. The system and method provides the means to calculate the current state of health of the industrial equipment or industrial measurement equipment. Leading indicator/failed component in the industrial equipment or industrial measurement equipment can be tracked down in the event of a failure. The system and method provides the means to label the normal and abnormal periods in the historical data based on the diagnostic alarms and signals available from the industrial equipment or industrial measurement equipment.

Real-time diagnostic signals from the industrial equipment or industrial measurement equipment, and process measurements such as, for example, flow, pressure, pressure control valve position, and variable frequency drive run status and speed are utilized to identify failure states. Process measurements are also used to determine the operating mode of the process, whether it is in shutdown/transition/normal operating mode. Different models are utilized in different operating modes to predict the failure and determine the heath score of the industrial equipment or industrial measurement equipment.

Diagnostic signals available from the industrial equipment or industrial measurement equipment are grouped based on the physical properties that they represent and the units that they are measured in. For each of the individual groups of measurements, the specific anomaly detection model is utilized and identifies the quantity of the anomaly ranging from 0 to 100%. It assigns an anomaly score of 0 to 100% to each group of variables.

Along with the failure alert, a confidence measure of the prediction is also provided. The confidence measure is estimated based on the anomaly score and how long the anomaly score has violated the predetermined threshold.

The failure prediction alert is cleared when the anomaly score drops below the predetermined threshold with a dead band. The health score calculation uses the calculated anomaly scores from different groups. The health score calculation is achieved through a state space model, where the health score is treated as a state and the anomaly scores from different variable groups are treated as inputs. The health score ranges between 100% (good health) to 0% (bad health). A means to auto label the historical data is provided based on the diagnostic alarms from the industrial equipment or industrial measurement equipment. The users can then override the automatically generated labels and assign labels to the data based on the known industrial equipment or industrial measurement equipment failure history.

The root cause/leading indicators of the failure/low health score is determined through a root cause tree. The root cause tree highlights the variable group with the anomaly. Also, it highlights the industrial equipment or industrial measurement equipment which reads the anomalous data. The anomaly thresholds for the level data are determined from the historical normal operating data.

The solution is platform agnostic and can be implemented in any programming language-based platforms. The solution can be deployed in the in a cloud or distributed environment, or on premise servers or edge devices. The solution can work with all types of UFMs, including, for example, with 4 path, 6 path, 8 path or 16 path UFMs.

Figure 1:
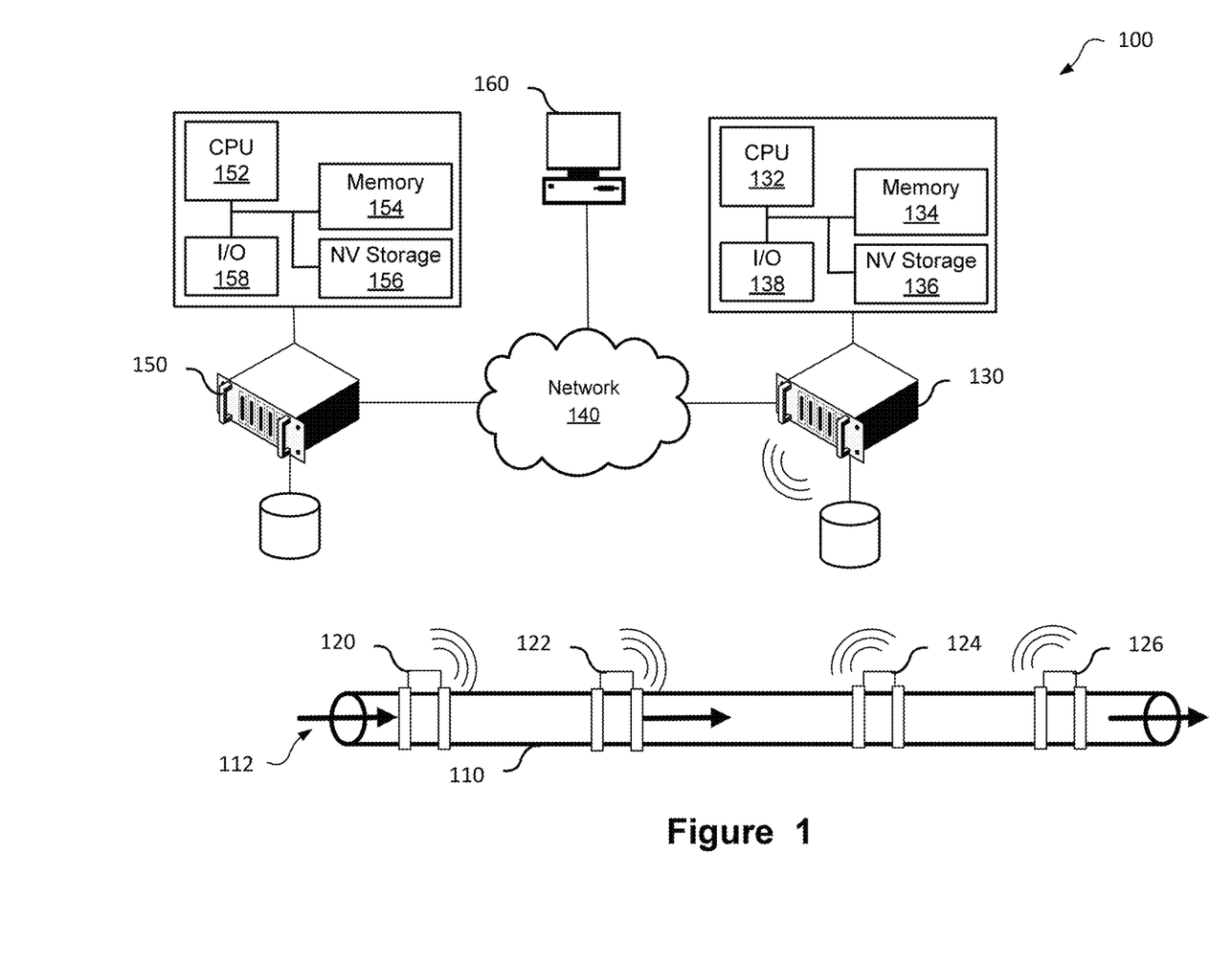
FIG. 1 shows a system for anomaly detection and failure prediction for predictive monitoring of ultrasonic flow meters.

With reference to FIG. 1, a system 100 for anomaly detection and failure prediction for predictive monitoring of ultrasonic flow meters is shown. A pipeline 110 carrying a medium such as a liquid 112 has multiple UFM's 120, 122, 124, 126 dispersed along the length of the pipeline to monitor conditions and detect anomalies. The UFM's 120, 122, 124, 126 are monitored by an operator 130 remotely. The UFM's may communicate via wired or wireless communications to the operator 130 or data may be periodically retrieved from the UFM for uploading to the operator 130. The UFM's are utilized to detect possible leaks in the pipeline or process issues which may be impacting performance of the pipeline. Each UFM can contain multiple transducers positioned fluid flow to determine associated flow parameters. During the operation life of the UFM's transducers may fail or degrade in performance needing replacement. Current systems only identify failure once it has occurred or may be associated with a failure of the pipeline itself. The operator system 130 collects operation data from the UFM's to monitor the status of the pipeline 110. Performance metrics can be collected from the UFM's and stored by the operator system 130 for analysis. The operator system 130 also contains or received process information related to the pipeline such as operation status to enable correlation of the performance data with the operation status. The operator system 130 contains one or more processors 132, memory 134, non-volatile storage 136 containing computer readable instruction and input/output interfaces 138 to interface with one or more networks. A data storage device may be couple to or associated with the operator system 130 for collecting and storing diagnostic and process related data. An analysis system 150 can be coupled to the operator system 130 via one or more networks 140. The analysis server 150 may be incorporated in the operator system 130, remote from the operator system 130, or distributed in a cloud based environment. The analysis system 150 contains one or more processors 152, memory 154, non-volatile storage 156 containing computer readable instruction and input/output interfaces 158 to interface with one or more networks. The analysis system 150 processes performance data from the UFM's provided by the operator system 130 to determine predictive failures of the UFM's or associated transducers. By utilizing historical and real-time (or near real-time) data predictive trends on potential failures can be identified and allow preventative maintenance to occur. A monitoring dashboard can be display on a computing device 160 to identified operation status and additional to potential UFM's and associated transducers which may fail in addition to the parameter which is indicating if a fault is detected, a failure is predicted, a time to failure and a confidence prediction of an associated failure.

Figure 2:
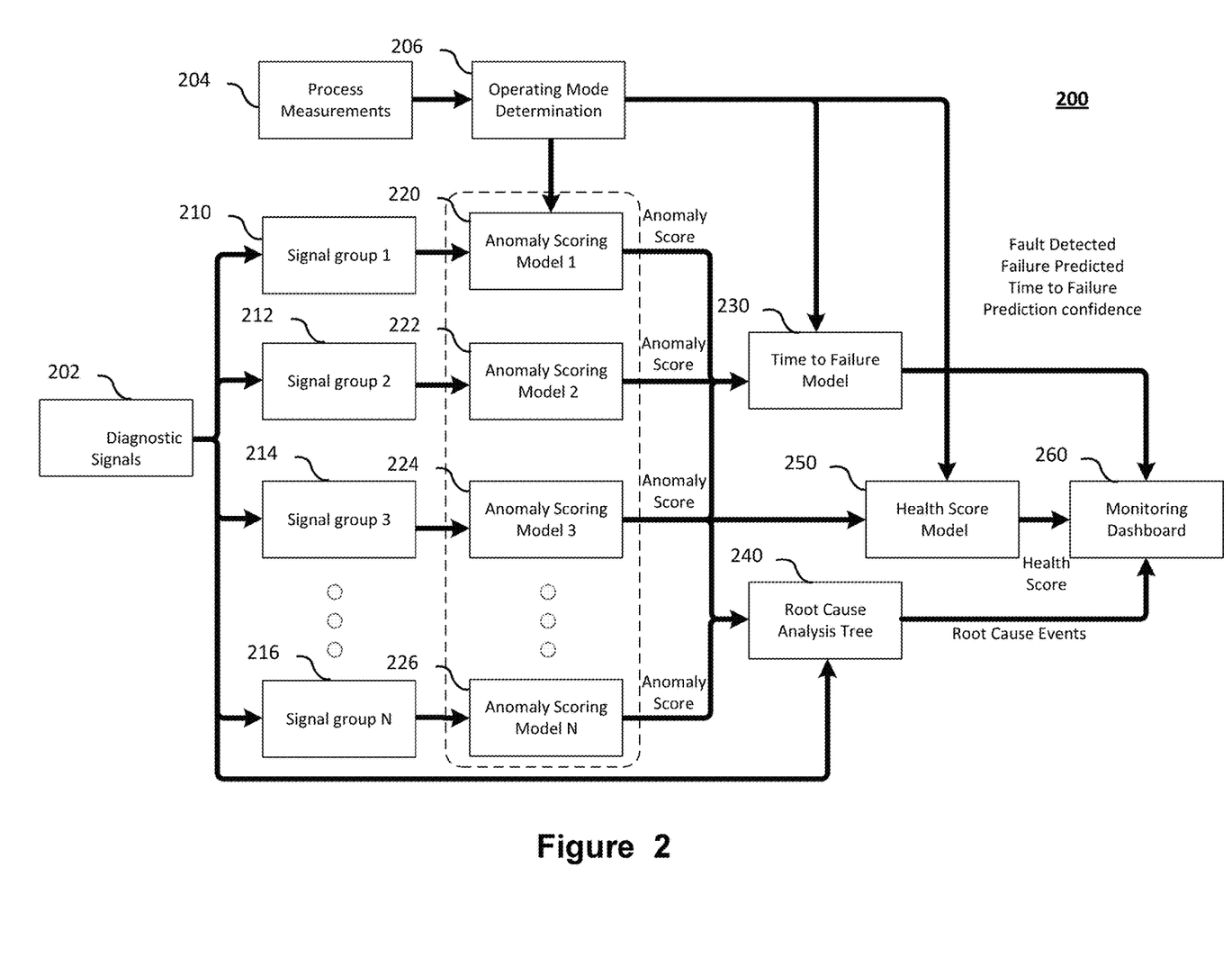
FIG. 2 shows a processing framework for anomaly detection and failure prediction for predictive monitoring of industrial equipment and industrial measurement equipment.

Referring to FIG. 2, a schematic of the industrial equipment or industrial measurement equipment Predictive Monitoring Framework is shown. FIG. 2 shows a processing framework for anomaly detection and failure prediction for predictive monitoring of industrial equipment or industrial measurement equipment. The solution takes real-time or near real-time live or batch of data as inputs. The input data to the solution includes the process measurements and the diagnostic signals from the industrial equipment or industrial measurement equipment. The signals that represent similar physical properties may be named differently by different industrial equipment or industrial measurement equipment vendors. The solution determines the operating mode of the process associated with the industrial equipment or industrial measurement equipment from the available process measurements.

The solution automatically splits the diagnostic signals (202) from a industrial equipment or industrial measurement equipment into multiple signal groups (210), (212), (214), (216) as shown in FIG. 2. Each signal group (210), (212), (214), (216) is made of signals that represent a similar physical property and have the same unit of measurement. For each of the signal group, an anomaly scoring model (220), (222), (224), (226) scores the signals from 0 (no anomaly) to 100% (highest anomaly score) and outputs an anomaly score. Historic data associated with the signal group is processed to identify correlation between parameters and potential failure modes. The derived models can then be utilized to process real-time, or near-real-time data to determine failure modes.

For each signal group there exist multiple anomaly scoring models (220), (222), (224), (226). The anomaly scoring model (220), (222), (224), (226) to be used is determined based on the operating mode (206) of the process. The anomaly scores are then fed to the time to failure model (230). The time to failure model outputs the following as a function of the anomaly scores, (i) Fault detection status, (ii) Failure prediction status, (iii) Time to meter failure and (iv) Confidence of the prediction.

There exists multiple time to failure models, the model to be used is determined based on the operating mode of the process. The anomaly scores are also fed to the health score model (250). The health score model determines the health of the industrial equipment or industrial measurement equipment as function of the anomaly scores.

There exists multiple health score models, the model to be used is determined based on the operating mode of the process. The anomaly scores and the diagnostic signals are fed to the Root Cause Analysis Tree (240). The Root Cause Analysis Tree (240) determines and flags anomalies in various signal groups and the component level diagnostic signals.

The outputs of the Time to Failure Model (230), Health Score Model (250) and Root Cause Analysis Tree (240) can be fed to an asset monitoring dashboard where the end user may access the results of the predictive monitoring solution. The solution also includes a workflow to trigger emails in case of a failure event is predicted.

The operating mode of the process is determined from the process measurements available to the solution. The process measurements are compared to their historical operating limits in different operating modes to determine the operating mode, e.g. shutdown, steady state and mode transition. The results are provided to a monitoring dashboard (260). It should be understood that the performance of industrial equipment or industrial measurement equipment may be determined without other process information and may utilize only historical information associated with the industrial equipment or the industrial measurement equipment itself or statistically derived ideal parameters.

Figure 3:
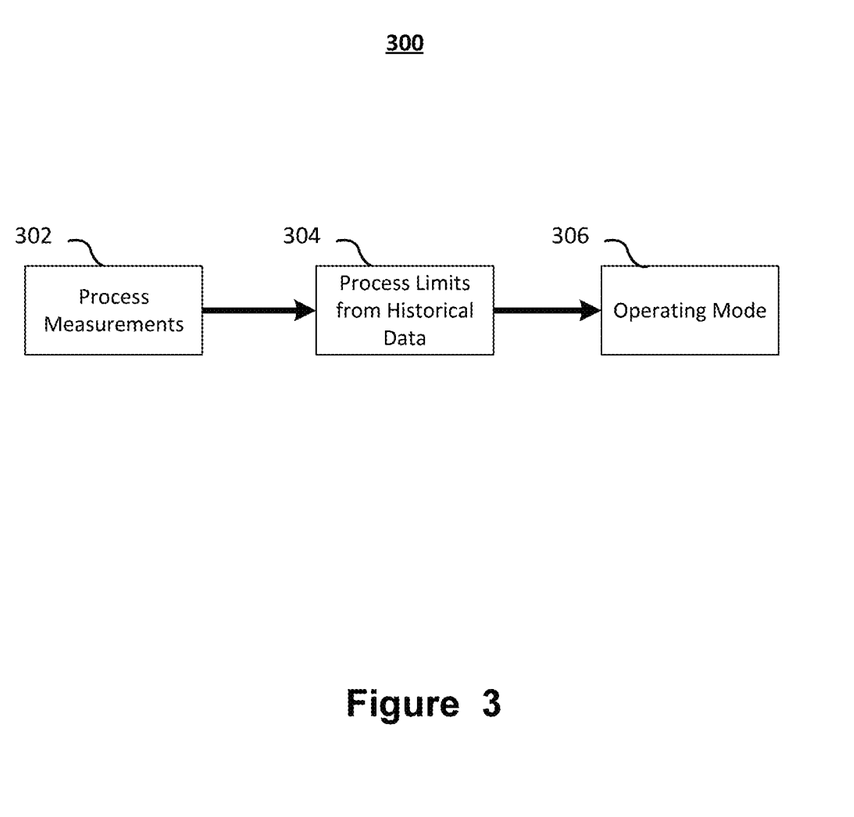
FIG. 3 shows a method of operating mode determination.

FIG. 3 shows a method of operating mode determination. The operating mode of the process can be determined from the process measurements (302) available to the system. The process measurements are compared to their historical operating limits in different operating modes (304) to determine different operating modes, e.g. shutdown, steady state and mode transition (306). The operating modes can be identified by the operator system 130 for association with the process operational data based upon process measurements.

Figure 4:
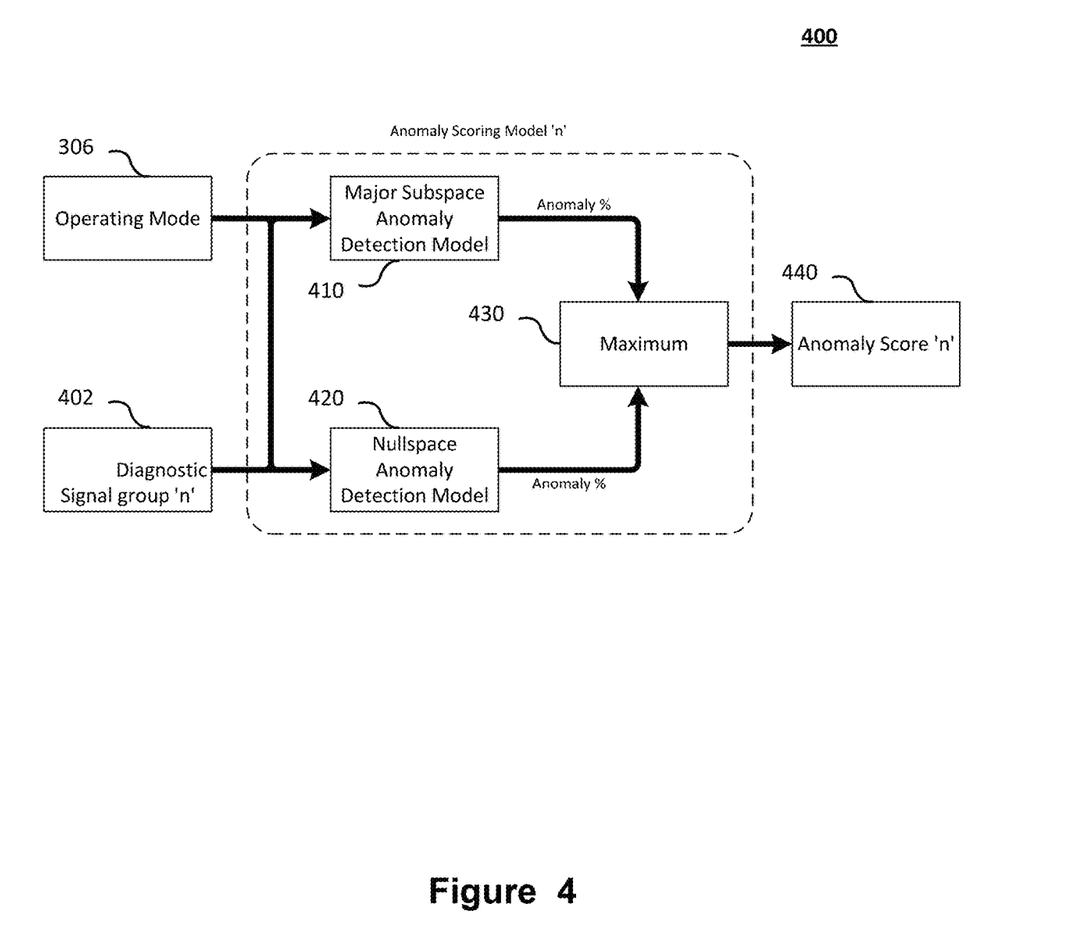
FIG. 4 shows method of anomaly scoring.

FIG. 4 shows method of anomaly scoring. The anomaly scoring models for each signal group is based on a signal projection technique using the determined operating mode (306) and industrial equipment or industrial measurement equipment diagnostic signal group 'n' (402) associated with groupings 210, 212, 214 and 216. The models project the signal groups into anomaly detection major space (410) and anomaly detection null space (420). Based on the significance of the violation of the spaces, the anomaly detection models assign anomaly scores from 0 to 100%. The maximum of the anomaly scores determined by the major space anomaly detection model (430) and the null space anomaly detection model is selected as the anomaly score of the signal group (440). The scoring utilizes historical performance of the associated industrial equipment or industrial measurement equipment to identify an anomaly. Parameters such as Upstream and Downstream Signal %, Signal to Noise Ratio, TX and RX Gain can primarily be used to identify performance issues based upon a transducer, for example, or define a component for each industrial equipment or industrial measurement equipment. Additional parameters such as Travel Time Difference, Travel Time Absolute, Flow Velocity, Velocity Of Sound, Analog To Digital Calibration, Turbulence can also be utilized. In the case of UFMs, parameters such as Cross Flow, Plane Balance Ratio, Symmetry, Profile Flatness, Cycle Time, Pulse Count, Flow Profile, Flow Rate, Density, Viscosity, Flow Velocity, Swirl, Accumulated Forward Flow, Accumulated Reverse Flow, Number of Components, Meter Status, Calculated Status, Reynolds Number, Meter Alarm Status, Fluid Pressure, Fluid Temperature, Asymmetry Ratio and Average Signal % can be utilized in parameter correlation. Parameters such as Average Turbulence, Time Averages of All the signal Above, Moving Standard Deviation of All the signals, Moving Minimum Values of All the signals, Moving Maximum Values of All the signals may also be incorporated into the predictive modelling to identify failures. In the case of rotating industrial equipment, vibration transmitter measurements, variable frequency drive measurements, equipment operating curves, oil analysis and process measurements such as flow, pressure, temperature can be used to identify performance. In the case of other industrial equipment or industrial measurement equipment, other similar parameters may be incorporated into the predictive modelling to identify failures and used to identify performance.

Figure 5:
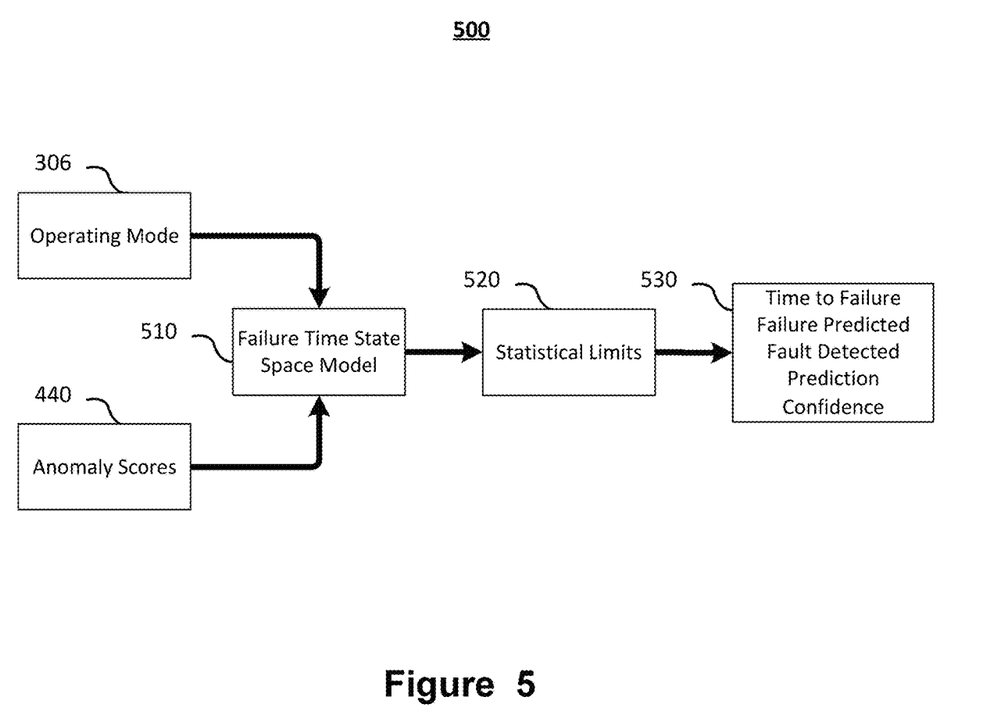
FIG. 5 shows a method of determining time to failure.

FIG. 5 shows a method of determining time to failure. The time to failure model accepts the operating mode (306) and the anomaly scores as the inputs (440). The time to failure model (510) weighs the gradient changes in anomaly score to determine the states of the industrial equipment or industrial measurement equipment. Based on the statistical limits (520) on the states of the industrial equipment or industrial measurement equipment, the following outputs are derived, (i) Time to Failure, (ii) Failure Predicted, (iii) Fault Detected and (iv) Prediction Confidence (530). The failure metrics can be identified for each component of the respective industrial equipment or industrial measurement equipment.

Figure 6:
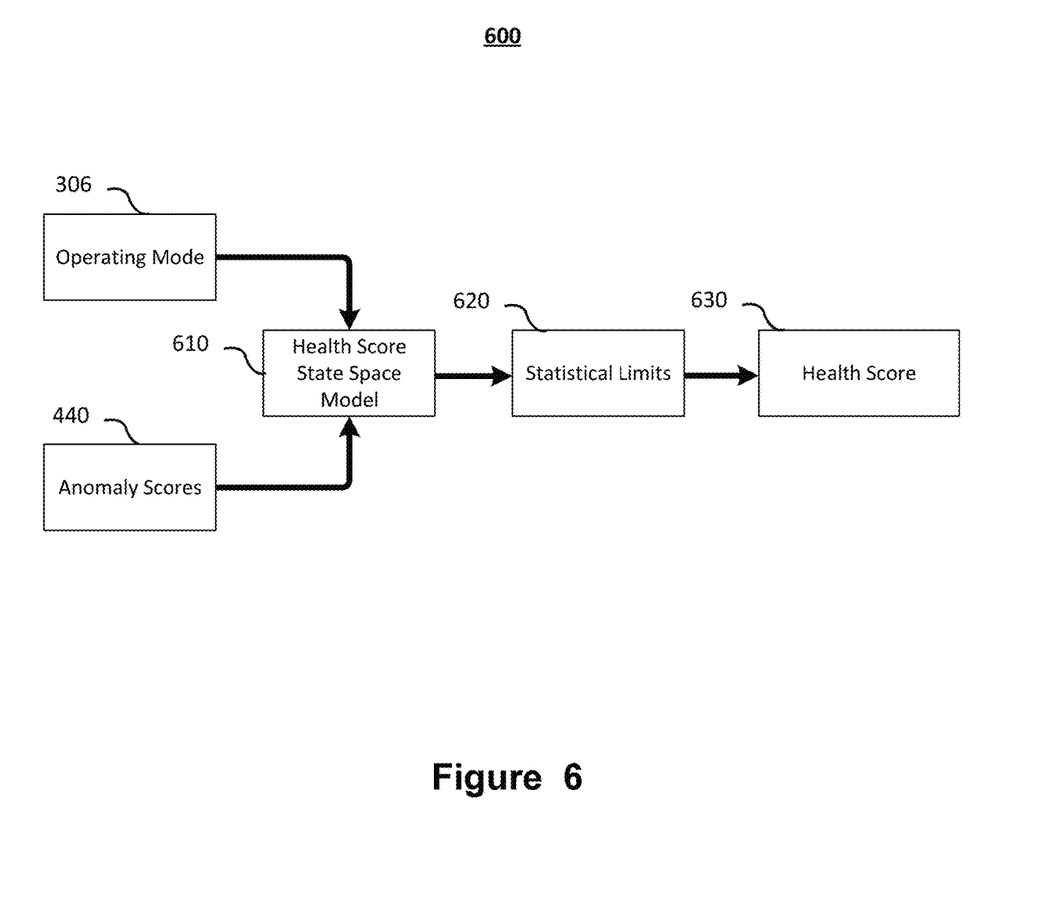
FIG. 6 shows a method of health scoring.

FIG. 6 shows a method of health scoring. The health score model accepts the operating mode (306) and the anomaly scores (440) as the inputs. The health score model (610) weighs the gradient changes in anomaly score to determine the states of the industrial equipment or industrial measurement equipment. Based on the statistical threshold (620) on the states of the industrial equipment or industrial measurement equipment, the industrial equipment or industrial measurement equipment health is determined (630).

Figure 7:
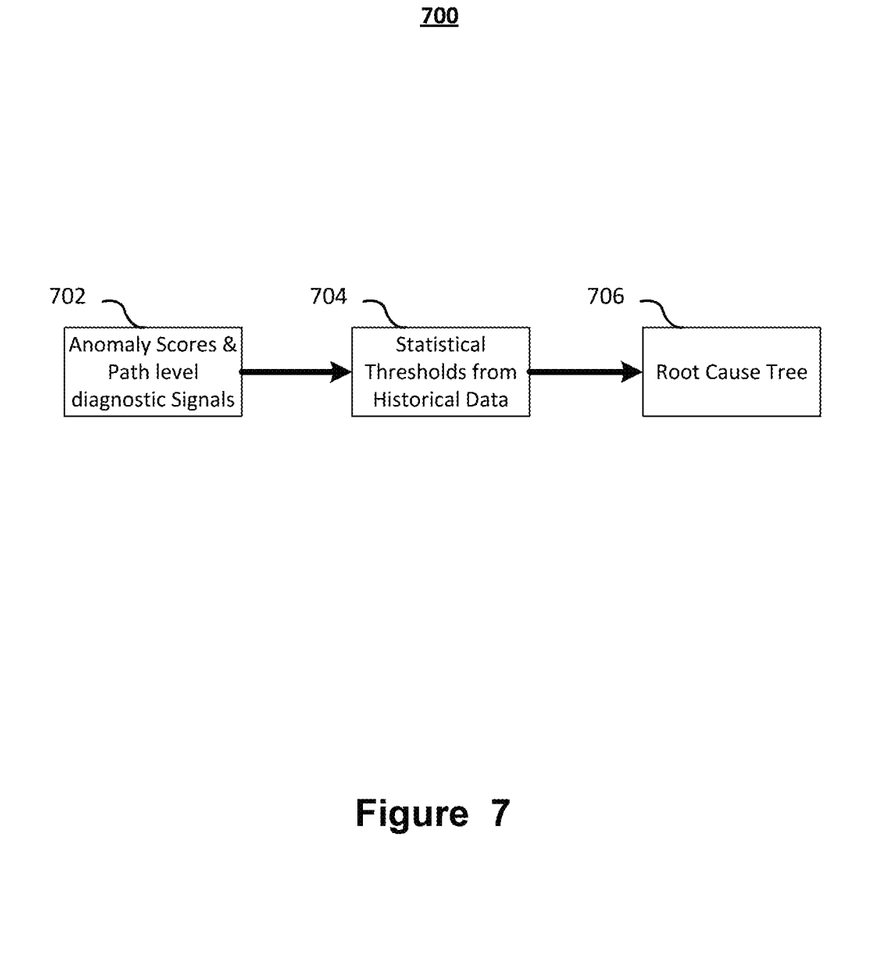
FIG. 7 shows a method of root cause analysis processing tree.

FIG. 7 shows a method of root cause analysis processing tree. The root cause analysis logic accepts the anomaly scores and the component level diagnostics signals as the inputs (702). Based on the statistical thresholds on the anomaly scores and the component level diagnostic signals (704), the Root cause analysis logic determine anomaly events in the signal groups and the component level diagnostic signals. Based on the anomaly events, a root cause tree can be constructed (706).

Figure 8:
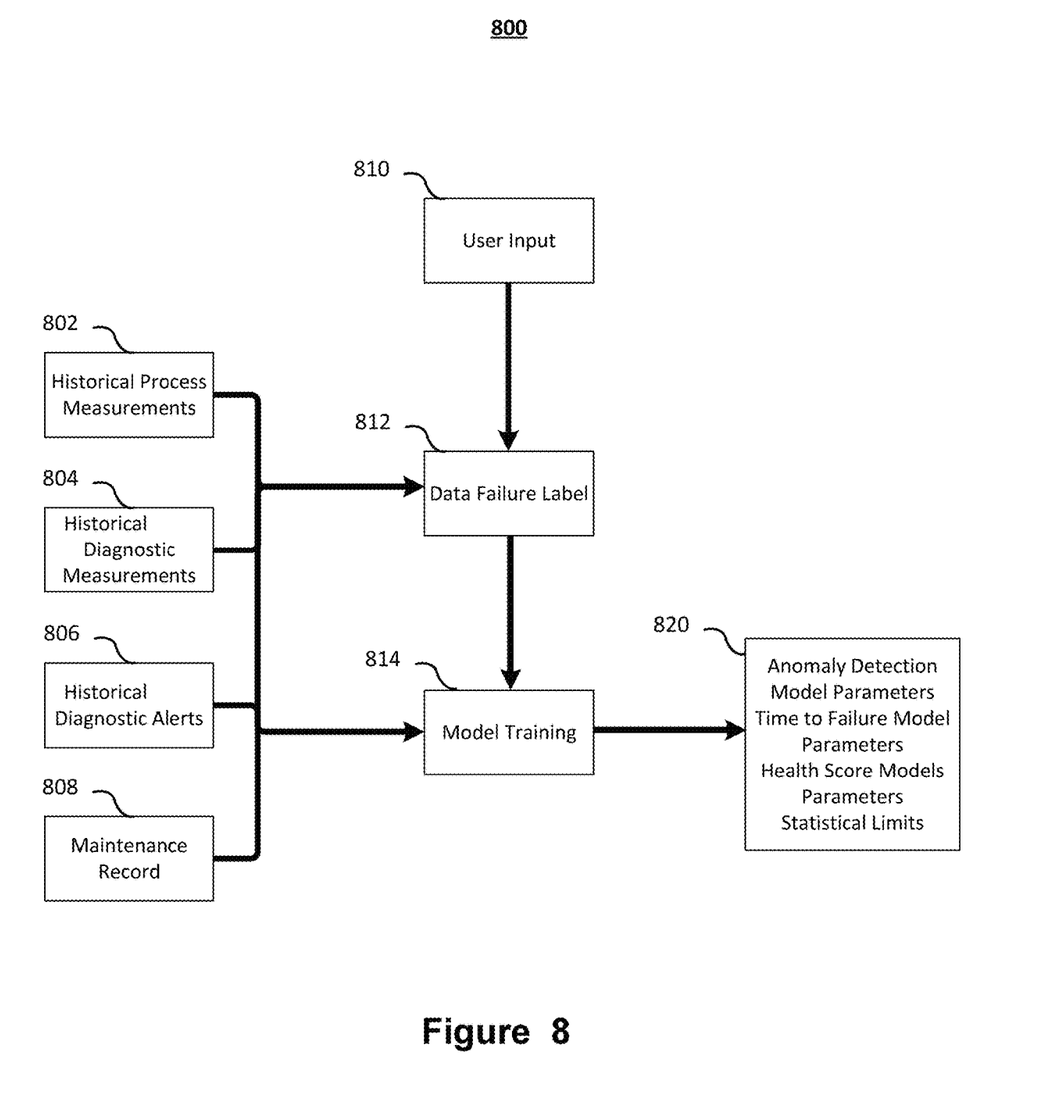
FIG. 8 shows a method of model training.

FIG. 8 shows a method of model training. The solution includes a set of seed parameters and estimates for the all the models and statistical thresholds mentioned above. However, to improve the accuracy of prediction, the model parameters and the limits can be tuned using the historical data (802). The tuning logic accepts maintenance records (808), historical data (804) and diagnostic alerts (806) as inputs. The tuning logic labels the historical data based on the alarms, events and maintenance logs as normal and failure data (812). Users may label the data or correct the label as necessary (810). Based on the historical data and failure labels, the model parameters and the statistical limits are derived (820) which are utilized to train parameter models (814).

Figure 9:
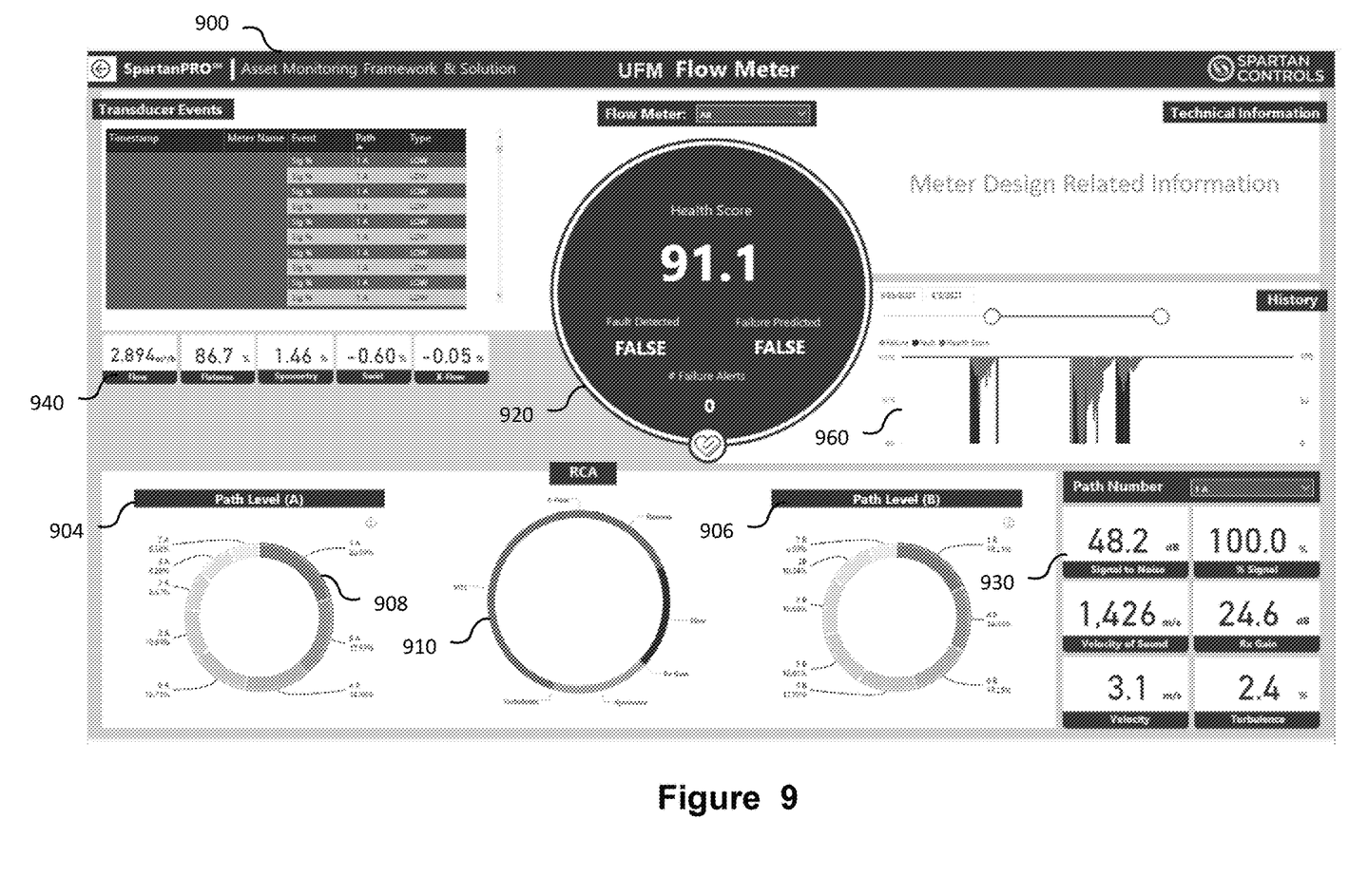
FIG. 9 shows a monitoring dashboard provided on a graphical user interface for monitoring an ultrasonic flowmeter.

FIG. 9 shows a user interface 900 for identifying status of an example UFM. The user interface 900 shows a path A 904 and path B 906 associated with a direction of flow associated with a respective UFM. For each path, the associated transducers, or sensors, are identified in a graphical representation, for example for Path Level (A) 904, transducers 1 A to 8 A are shown and an associated percentage of variation of performance. For a selected component/transducer 1 A 908 a root cause analysis (RCA) 910 can identify the parameters which are varying outside expected modelled parameters. For example, for transducer 1 A the velocity of sound (VOS) measurements are varying the most and would be represented as the primary parameter of variance. An overall health score 920 can be calculated for the respective UFM to provide an indication of when maintenance should be performed. Additional performance parameters 930 associated with the path or the UFM 940 can also be displayed. Historical data 960 can be provided to show performance and detected fault conditions, which may be correlated with process information and provide further insight into operational performance.

Figure 10:
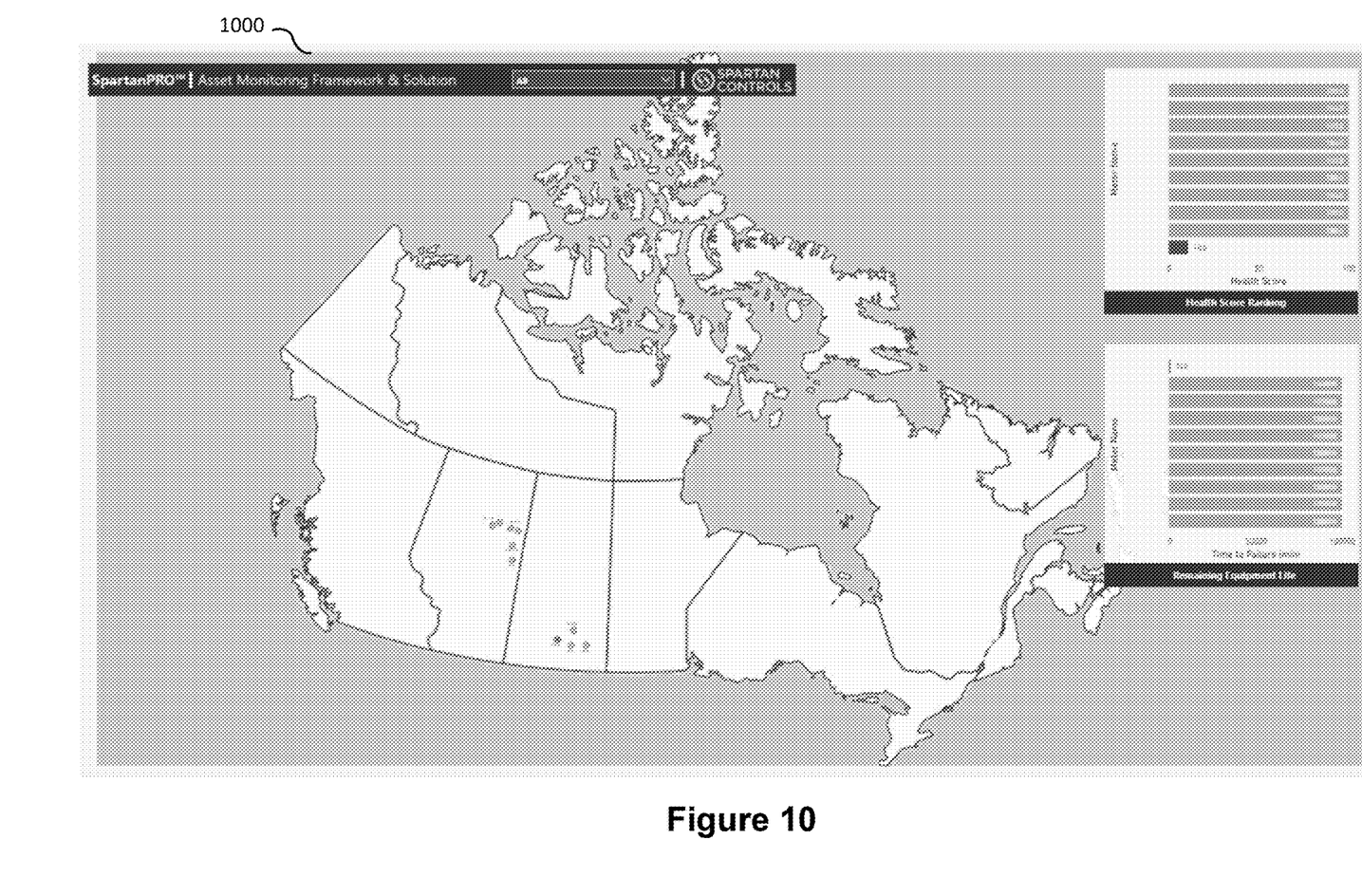
FIG. 10 shows a user interface for identifying location and status of ultrasonic flow meters.

FIG. 10 shows a user interface 1000 for identifying UFM location and status. A graphical representation of the location of UFM, collectively or based upon individual pipelines can be presented. Faults, under performing units or process status can be shown to pinpoint potential issues. Geographic and metrological data may also be identified and associated with performance parameters.

Figure 11:
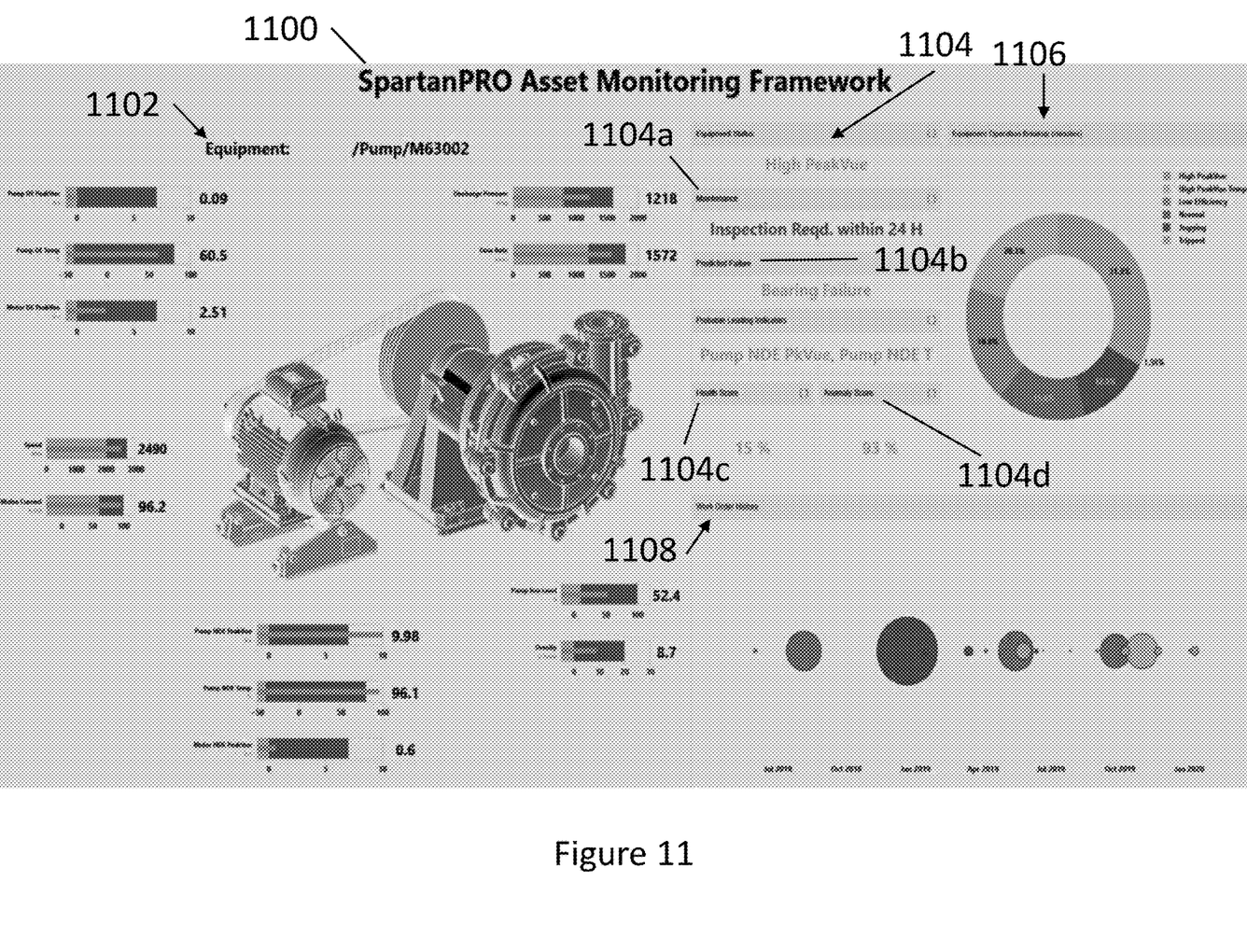
FIG. 11 shows a monitoring dashboard provided on a graphical user interface for monitoring a centrifugal pump.

FIG. 11 shows a user interface 1100 for monitoring a centrifugal pump. The user interface 1100 shows equipment identification information 1102 including operational conditions of the centrifugal pump in relation to normal operating conditions. General equipment status information 1104 derived by the systems and methods described herein is further displayed on the user interface 1100, including a next suggested maintenance event 1104a and a predicted failure 1104b, a health score 1104c and an anomaly score 1104d. Past performance of the centrifugal pump is further visualized by an equipment operation breakup 1106 and a work order history chart 1108.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-11 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The invention claimed is:

1. A method of anomaly detection and failure prediction for predictive monitoring of industrial equipment or industrial measurement equipment of an associated process, the method comprising:
    receiving a plurality of historical diagnostic measurements of respective measurement signal groups associated with a respective industrial equipment or industrial measurement equipment of the associated process;
    generating a detection model for each measurement signal group associated with the industrial equipment or industrial measurement equipment, defining statistical thresholds for operation of each measurement signal group derived from the plurality of historical diagnostic measurements;
    receiving real-time diagnostic measurements from each measurement signal group associated with the respective industrial equipment or industrial measurement equipment;
    scoring the received real-time diagnostic measurements using the generated detection model to generate performance metric scores for each of a major space projection and a null space projection of the detection model as a percentage of variability from the detection model; and
    identifying one of the performance metric scores for each measurement signal group to detect anomalies or predict potential failure of the industrial equipment or industrial measurement equipment selected from a maximum score from one of the major space projection or the null space projection.

2. The method of claim 1 further comprising:
    generating a predicted failure time for the industrial equipment or industrial measurement equipment from the received diagnostic measurements and the generated detection model.

3. The method of claim 1 further comprising:
    receiving historical process status information;
    associating the historical process status information with an operating mode of the process; and
    associating the operating mode of the process in the detection model.

4. The method of claim 1 wherein plurality of historical diagnostic measurements are grouped into signal grouping based on an associated weighting factor, wherein each group is associated with a respective detection model.

5. The method of claim 4 wherein the respective detection model is weighted with an importance metric identifying contribution to identifying performance of the measurement signal group.

6. The method of claim 5 wherein the statistical thresholds are generated from the detection model for each industrial equipment or industrial measurement equipment and associated measurement signal group.

7. The method of claim 1 further comprising generating a health score based upon a combination of performance metric scores of each measurement signal group.

8. The method of claim 4 further comprising generating a root cause analysis tree based on the statistical thresholds on the performance metric score and component level diagnostic signals.

9. The method of claim 1 further comprising generating a time to failure model.

10. The method of claim 1 wherein the plurality of historical diagnostic measurements and real-time or near-real-time diagnostic measurements associated the respective industrial equipment or industrial measurement equipment are remotely located and received through a network.

11. The method of claim 10 wherein the network is a wireless network.

12. The method of claim 10 wherein the network is a wired network.

13. The method of claim 1 further comprising correlating the plurality of historical diagnostic measurements if performed for multiple industrial equipment or industrial measurement equipment.

14. The method of claim 1 further comprising correlating the plurality of historical diagnostic measurements is performed for multiple industrial equipment or industrial measurement equipment associated with a respective model, type or brand identification.

15. The method of claim 1 further comprising labelling normal and abnormal periods in the historical diagnostic measurements based on diagnostic alarms and signals available from the industrial equipment or industrial measurement equipment.

16. A method of anomaly detection and failure prediction for predictive monitoring of ultrasonic flow meters of an associated process, the method comprising:
    retrieving a detection model generated from historical measurements of a measurement signal group associated with the ultrasonic flow meters;

receiving real-time diagnostic measurements associated with the ultrasonic flow meters of the associated process;

scoring the received real-time diagnostic measurements using the detection model to generate performance metric scores for each of a major space projection and a null space projection of the detection model of the detection model as a percentage of variability from the detection model;

identifying one of the performance metric scores for each measurement signal group to detect anomalies or predict potential failure of the ultrasonic flow meters, selected from a maximum score from one of the major space projection or the null space projection; and displaying the identified performance metric score and associated parameter primarily contributing to the performance metric score for a measurement signal group of the ultrasonic flow meter.

17. The method of claim 16 further comprising displaying a root cause analysis for a selected measurement signal group of the ultrasonic flow meter.

18. A system comprising:

a processor;

a network interface coupled to the processor for receiving diagnostic measurements from a plurality of industrial equipment or industrial measurement equipment associated with a process; and a memory containing instruction which when executed by the processor perform:

receiving a plurality of historical diagnostic measurements of respective measurement signal groups associated with a respective industrial equipment or industrial measurement equipment of the associated process;

generating a detection model for each measurement signal group associated with the industrial equipment or industrial measurement equipment, defining statistical thresholds for operation of each measurement signal group derived from the plurality of historical diagnostic measurements;

receiving real-time diagnostic measurements from each measurement signal group associated with the respective industrial equipment or industrial measurement equipment;

scoring the received real-time diagnostic measurements using the generated detection model to generate performance metric scores for each of a major space projection and a null space projection of the detection model as a percentage of variability from the detection model; and identifying one of the performance metric scores for each measurement signal group to detect anomalies or predict potential failure of the industrial equipment or industrial measurement equipment selected from a maximum score from one of the major space projection or the null space projection.

19. The method of claim 1 wherein the industrial measurement equipment is an ultrasonic flow meter or the industrial equipment is a rotating industrial equipment.

20. The method of claim 1 wherein the performance metric score is selected from one of the major space projection or the null space projection based on a significance of violation of the respective spaces.

* * * * *